May 19, 1925.

L. I. HEINTZ 1,538,324

KNOCKDOWN BODY FOR AUTOMOBILE TRUCKS

Filed Oct. 25, 1921 11 Sheets-Sheet 1

Inventor—
Leo I. Heintz.
by his Attorneys—
Howson & Howson

May 19, 1925.

L. I. HEINTZ 1,538,324

KNOCKDOWN BODY FOR AUTOMOBILE TRUCKS

Filed Oct. 25, 1921   11 Sheets-Sheet 2

Fig. 2

Inventor
Leo I. Heintz
by his Attorneys

May 19, 1925.

L. I. HEINTZ

1,538,324

KNOCKDOWN BODY FOR AUTOMOBILE TRUCKS

Filed Oct. 25, 1921  11 Sheets-Sheet 4

Inventor
Leo I. Heintz
by his Attorneys

May 19, 1925.

L. I. HEINTZ

1,538,324

KNOCKDOWN BODY FOR AUTOMOBILE TRUCKS

Filed Oct. 25, 1921    11 Sheets-Sheet 6

Inventor.—
Leo I. Heintz
by his Attorneys

May 19, 1925.

L. I. HEINTZ 1,538,324

KNOCKDOWN BODY FOR AUTOMOBILE TRUCKS

Filed Oct. 25, 1921 11 Sheets-Sheet 8

May 19, 1925. 1,538,324
L. I. HEINTZ
KNOCKDOWN BODY FOR AUTOMOBILE TRUCKS
Filed Oct. 25, 1921 11 Sheets-Sheet 10

Inventor
Leo I. Heintz
by his Attorneys

Patented May 19, 1925.

1,538,324

UNITED STATES PATENT OFFICE.

LEO I. HEINTZ, OF PHILADELPHIA, PENNSYLVANIA.

KNOCKDOWN BODY FOR AUTOMOBILE TRUCKS.

Application filed October 25, 1921. Serial No. 510,274.

*To all whom it may concern:*

Be it known that I, LEO I. HEINTZ, a citizen of the United States, residing in Philadelphia, Pennsylvania, have invented certain Improvements in a Knockdown Body for Automobile Trucks, of which the following is a specification.

The object of my invention is to construct the body of an automobile truck so that the parts can be made in quantities and packed in a comparatively small compass for shipment and can be assembled by the dealer without requiring the services of a skilled mechanic.

A further object of my invention is to provide a knock-down vehicle body comprising a plurality of separate and complete body units which are sturdy and durable, and which may readily and easily be detachably assembled to form the complete body, and which units are so designed that when they are assembled a sturdy reenforced structure is obtained.

A further object of my invention is to provide simple means which are adjustable, readily and easily for detachably securing the various body units tightly and firmly in place and to maintain the joints tight throughout.

Another object of my invention is to provide a knock-down vehicle body comprising a minimum number of separate and complete body units detachably secured together, and wherein the said body units are of such configuration and size that they are appropriate for packing together in a comparatively small compass for shipment.

Other objects of my invention will be in part obvious and in part pointed out hereinafter.

In accordance with my invention, I provide a plurality of separate and complete body units, such as rear side sections, each comprising rear side panels, socket members, and posts permanently secured together, the socket members being adapted to be detachably secured to cross pieces, and the side panels being adapted to serve as body stiffening members to such an extent that side sills may be omitted, and also to serve as supports for flooring; forward side sections, each preferably comprising a cab side panel having a doorway, a cowl side panel, front and rear door posts, and a lower supporting member extending the length of the unit, all permanently secured together, a door being also included if desired; a unit comprising a cowl top panel and an instrument board permanently secured together, this unit also incorporating a wind shield, if desired; transverse reenforcing and stiffening plates which serve as front and rear supports for a seat, and which also serve as transverse reenforcing and stiffening means between the opposite front and rear side units of the body; a flooring unit adapted to be supported by cross pieces, by one of said transverse reenforcing plates, and by the said rear side units, the cross pieces being detachable or being permanently incorporated in the flooring unit, if desired; and a top unit adapted to be detachably mounted on the upper ends of posts incorporated in other units, such as the said rear side units.

I provide means for detachably assembling said few separate and complete units together to form the complete body structure. Such means are fully and specifically described hereinafter, and, as will be seen, are of such simple character that skilled labor is not required for the assembling operations.

In order that a clearer understanding of my invention may be had, attention is hereby directed to the accompanying drawings forming a part of this application and illustrating certain embodiments of my invention, and in which:—

Fig. 31 is a sectional view on the line 31—31, Fig. 29;

Figure 1:
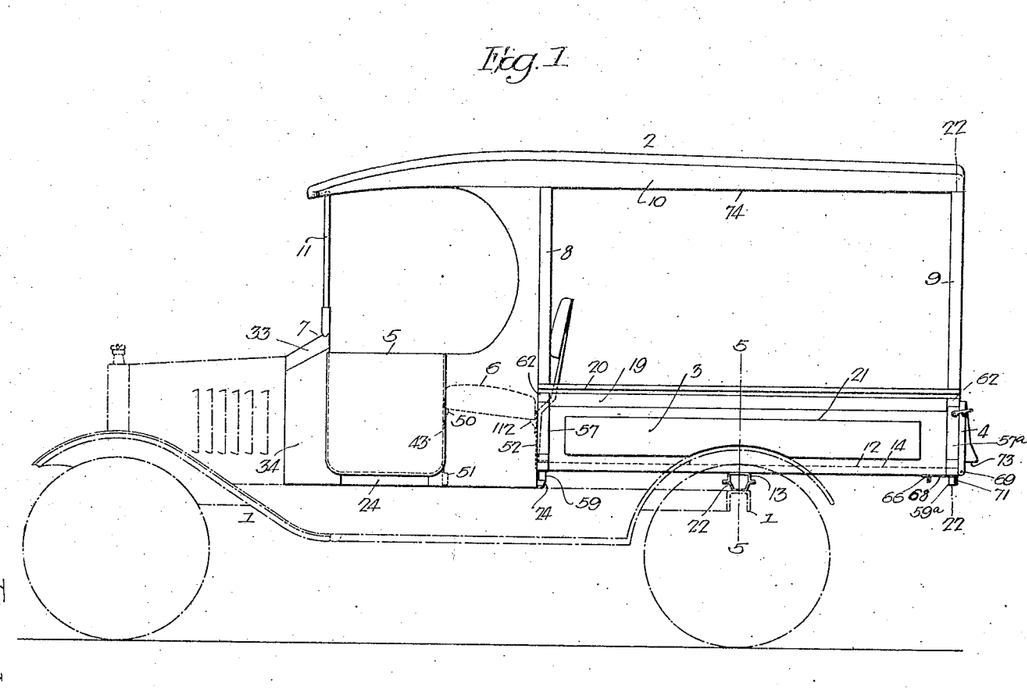
Fig. 1 is a side view of a delivery truck showing my improved body assembled.
Figure 2:
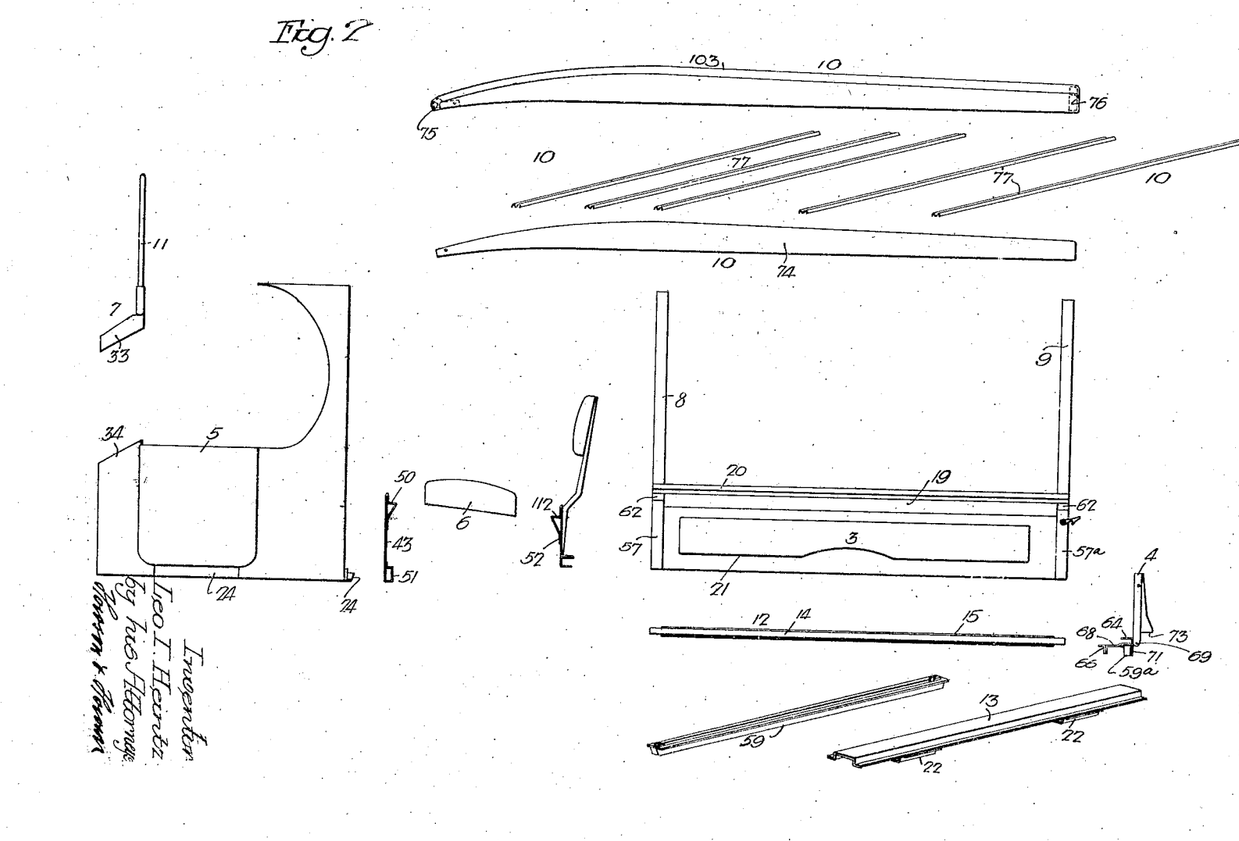
Fig. 2 is a view showing the parts of one side, the parts of the roof, and other parts detached.

Referring to the drawings, 1 is the chassis of an automobile truck. 2 is the body, which is mounted on the chassis, and, in the present instance, is of the design shown in Fig. 1, and is known as a delivery body. It will be understood at the outset that the design of the body may be varied without departing from the scope of the invention.

3 are the side panels of the body. 4 is the tail board. 5 is a door at the front. 6 is the operator's seat. 7 is the cowl. 8 are front posts and 9 are rear posts. 10 is the top and 11 is the wind shield. 12 is the floor of the body and 13 is a cross piece running from one side of the body bottom to the other.

Figures 4, 6, 7, 8, 9, 10:
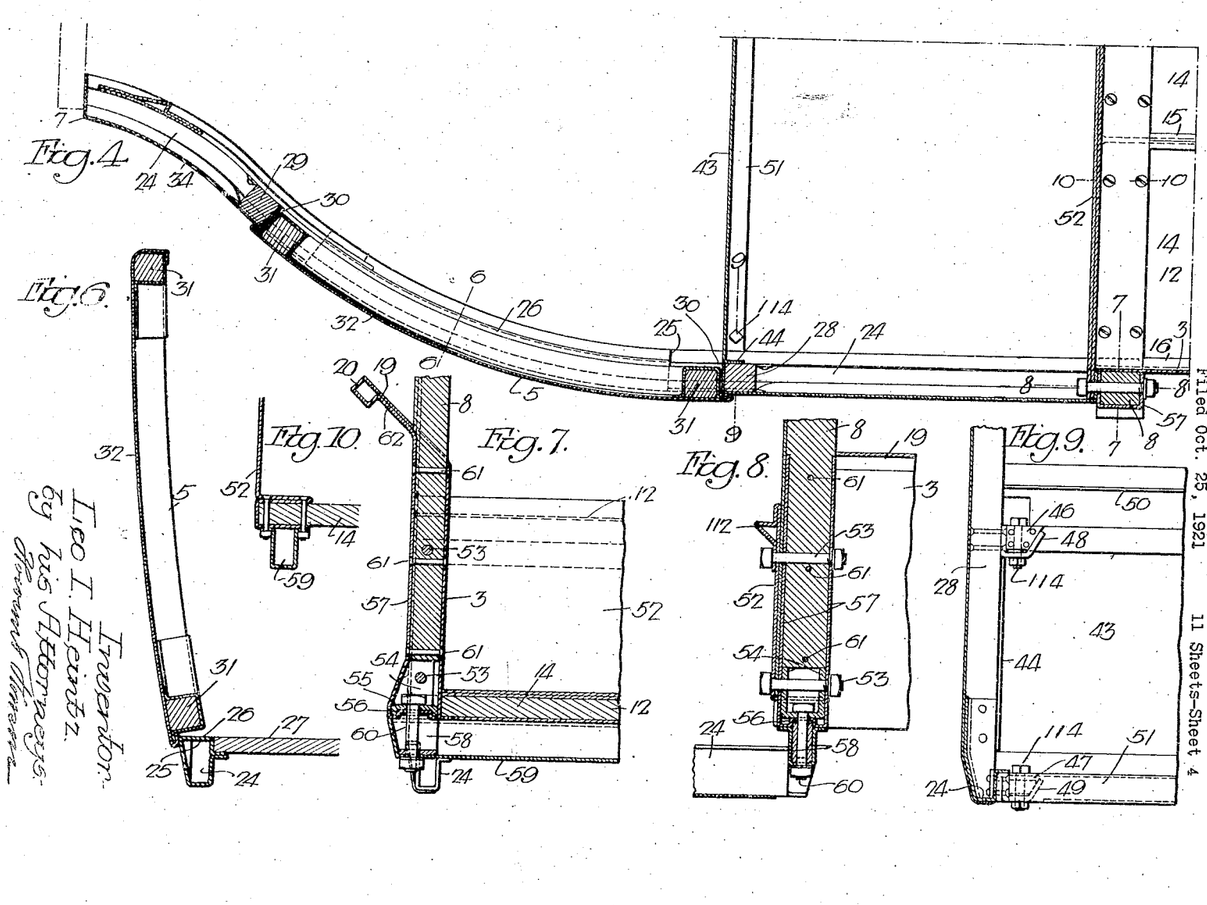
Fig. 4 is a sectional plan view on the line 4—4, Fig. 3.
Fig. 6 is a sectional view on the line 6—6, Fig. 4.
Fig. 7 is a sectional view on the line 7—7, Fig. 4.
Fig. 8 is a sectional view on the line 8—8, Fig. 4.
Fig. 9 is a sectional view on the line 9—9.
Fig. 10 is a sectional view on the line 10—10, Fig. 4.
Figure 5:
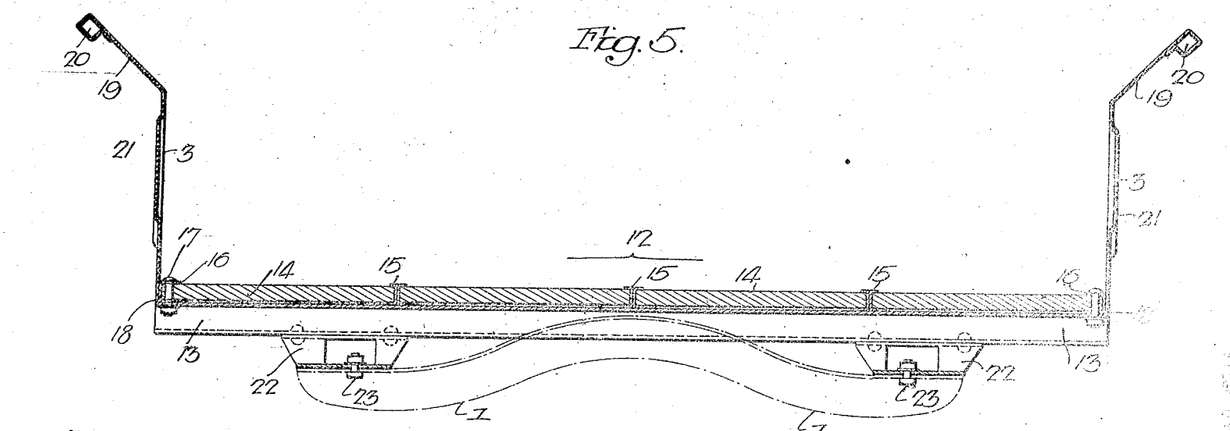
Fig. 5 is a sectional view through the joints of the truck on the line 5—5, Fig. 1.
Figures 22, 23, 24:
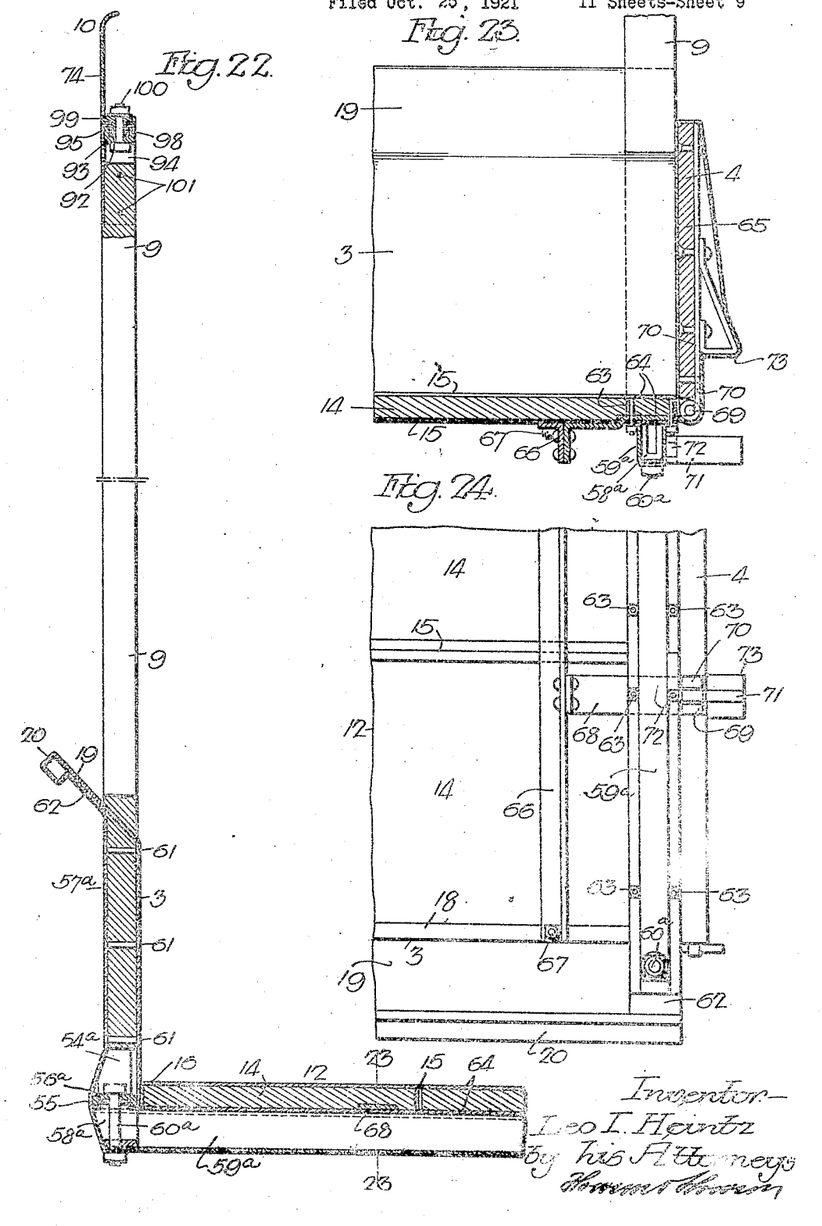
Fig. 22 is a sectional view on the line 22—22, Fig. 1, showing the rear post and its connections with the bottom and top of the body.
Fig. 23 is a sectional view on the line 23—23, Fig. 22, illustrating the construction of the tail board.
Fig. 24 is an inverted plan view of one side of the rear end of the body, showing the details of construction of the tail board support.

Referring in the first instance to Fig. 5, the floor of the body consists of a series of planks 14. At the meeting edges of the planks are thin channel members 15, which overlap the floor and form the metallic ribs for taking the wear. At each end of the floor are channel members 16, the flanges of which are of sufficient depth to allow bolts 17 to pass therethrough and through a flange 18 at the lower edge of the panel section 3 and the body of the cross piece 13. The panel section is flared at the upper edge 19 and is turned over upon itself to form a rectangular rib 20 extending the full length of the panel. The panel is embossed at 21. The embossing and flanging of the panel strengthens it materially. The panel, in fact, becomes a beam, which supports the floor sections and stiffens the structure to such an extent that the ordinary side sills are dispensed with. The cross piece has brackets 22 to which the frame of the chassis is attached by bolts 23, Fig. 5. The front edge of each panel 3 is permanently secured to a post 8 and to a post socket 57 by means of rivets 61 or the like (Figs. 7 and 8). The rear edge of each panel 3 is permanently secured to a post 9 and to a socket 57ᵃ by means of rivets 61 or the like (Fig. 22). Each panel 3 with the sockets and posts permanently attached thereto thus constitutes a separate and complete attachable body unit, hereinafter called a rear side body unit or section, adapted for detachable assembly as a unit into the body.

The forward end or cab of the body of the truck from the post 8 to and including the cowl is supported on channel members 24, in which the channel is uppermost. This channel member has flanges. At the door opening, the channel member has an extension 25, which is bent over, as shown in Fig. 6, to form the door sill 26 and to close the open channel. The flange on the inside is below that on the outside and forms a support for the floor boards 27, Fig. 6. This particular construction is set forth and claimed in a patent issued to me on January 9, 1923, No. 1,441,853.

Figures 11, 13, 14, 15:
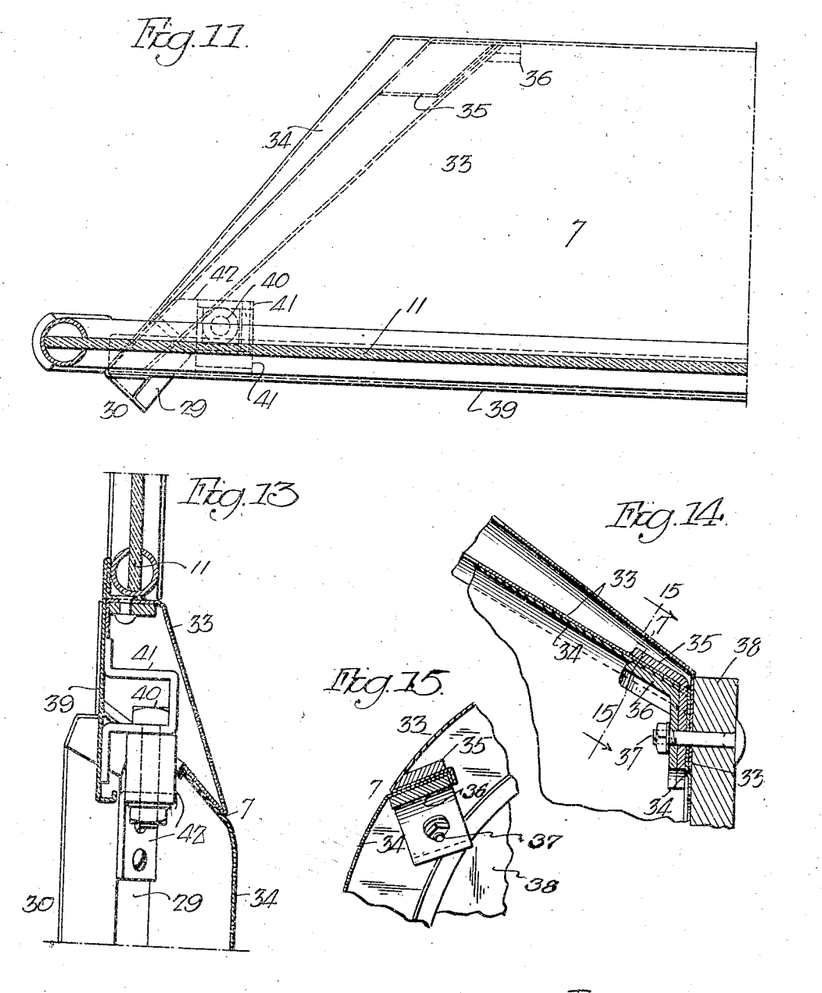
Fig. 11 is a sectional view on the line 11—11, Fig. 3.
Fig. 13 is a sectional view on the line 13—13, Fig. 12.
Fig. 14 is a sectional view on the line 14—14, Fig. 12.
Fig. 15 is a sectional view on the line 15—15, Fig. 14.
Figure 12:
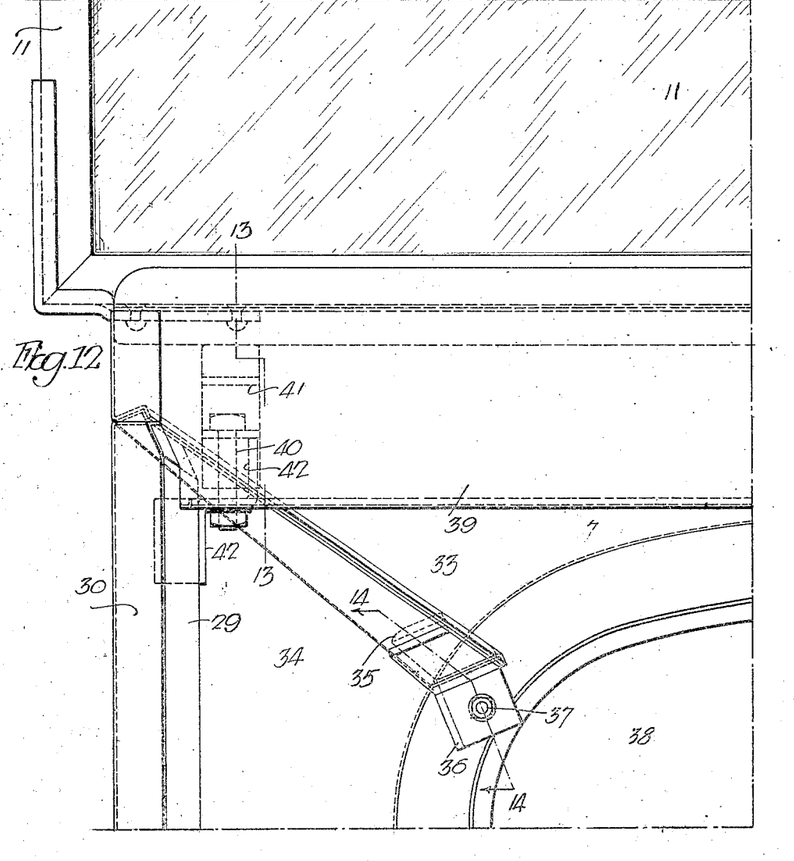
Fig. 12 is a rear elevation showing a portion of the cowl and the wind shield.
Figure 16:
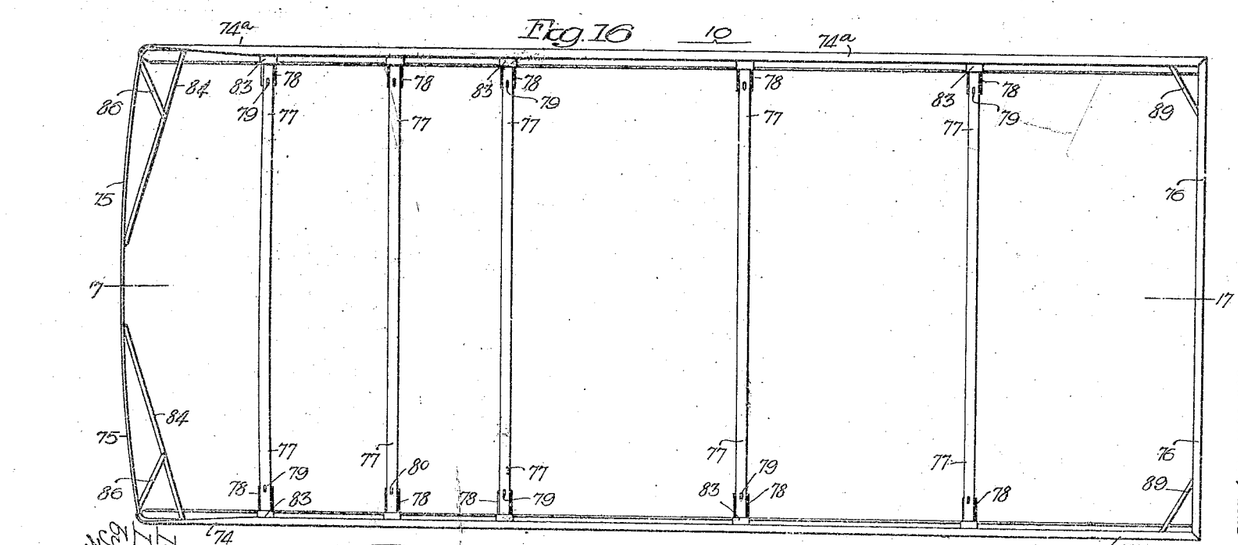
Fig. 16 is a plan view of the top with the cover removed.
Figures 17, 18:
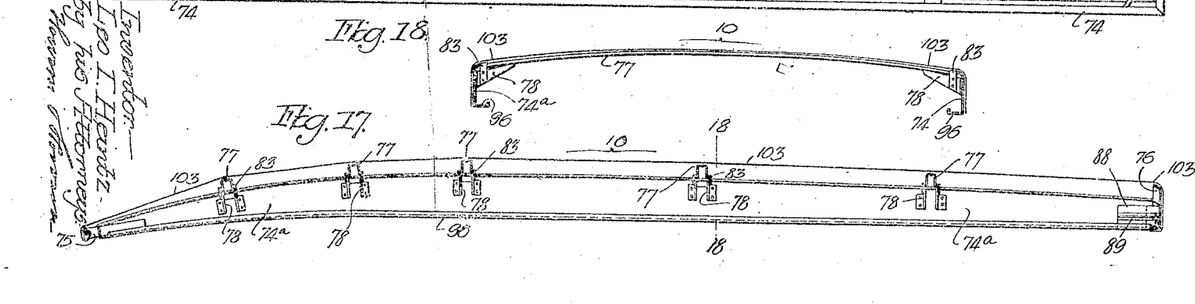
Fig. 17 is a longitudinal sectional view of the top on the line 17—17, Fig. 16.
Fig. 18 is a transverse sectional view on the line 18—18, Fig. 17.

The door 5, made as shown in Figs. 4 and 6, is located between posts 28 and 29 and may be hung on either one of the posts and is arranged to swing outwards. The door consists of a frame 31 with a sheet metal covering 32, flanged as shown in Fig. 4, to fit against the outside of the posts 28 and 29. Each side is preferably curved, as shown, and the portion of the body beyond the front of the door forms part of the cowl 7. The partings of the side plates 34 with the plates of the top portion 33 of the cowl are in diagonal lines, as shown in Figs. 11 and 12. Each forward panel member includes a cowl side and cab side paneling, front and rear door posts, a door, if desired, and a supporting channel member 24 are all permanently secured together to constitute a separate and complete, attachable body unit, hereinafter called a forward side body unit or section, adapted for detachable assembly as a unit into the body.

The plates 34 of the sides are bent in parallel with the bent in portions of the plate 33, Fig. 15, providing interlocking flanges which are clamped by plates 35 and 36 and the flanges have upset inner edges overlapping the edge of one clamping member 36 and interlocking therewith to prevent sidewise slippage between the flanges and the clamping plates 35 and 36. These plates are bent, as shown in Fig. 14, and are secured by bolts 37 to the dash board 38 of the chassis. The inner end of the cowl section is secured to the instrument board 39, as shown in Fig. 13. A bolt 40 passes through a U-shaped piece 41 welded to the instrument board and there is an angle plate 42 secured to the door post 29, plate 42 cooperating with member 41 and being detachably secured thereto by bolt 40. The above connection is clearly shown in Figs. 11 to 15 of the drawings. The cowl top panel 33, the instrument board 39, and the wind shield may each be considered as separate body units, or the panel 33 and instrument board may be secured together and shipped as a single unit, or all three elements may be united and shipped as a single unit.

Figure 3:
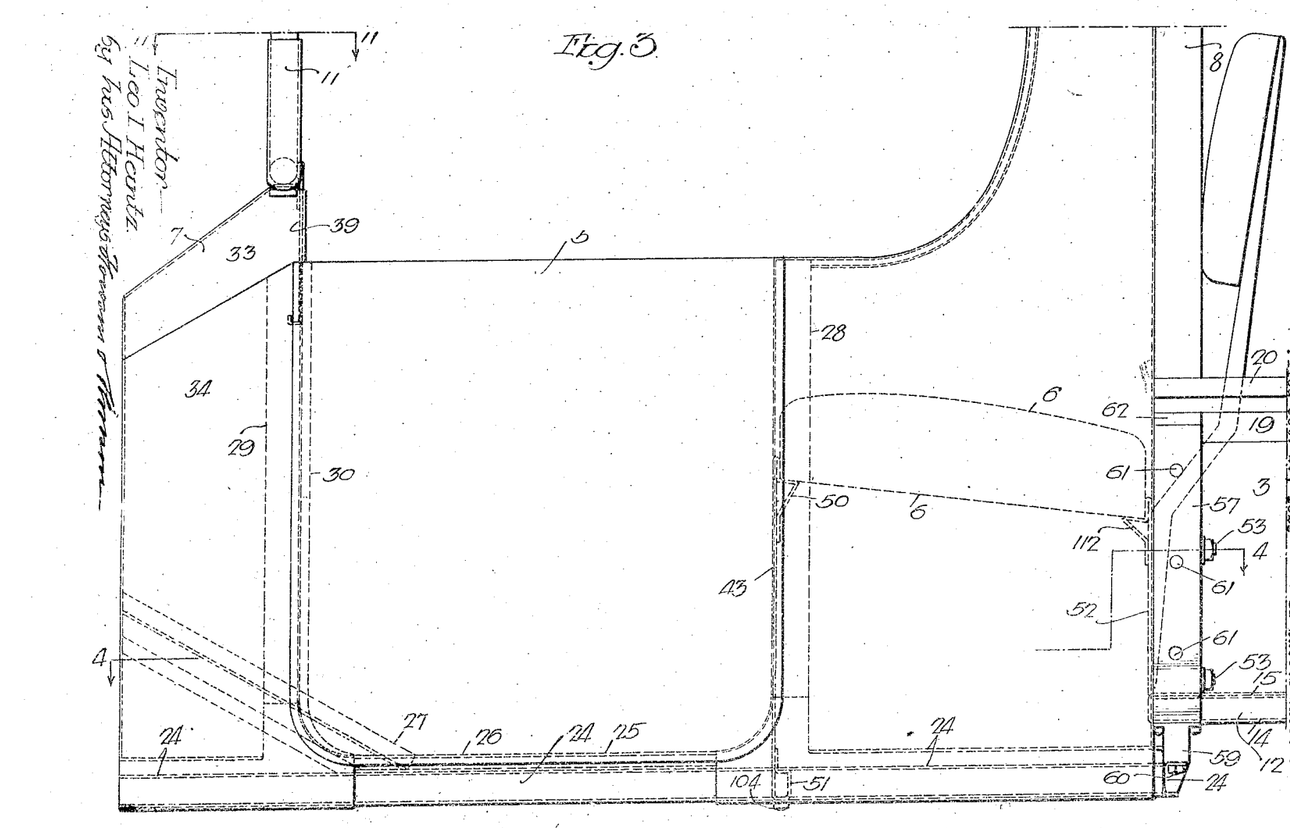
Fig. 3 is a side view of the forward end of the body including the side door and the seat section.
Figure 25:
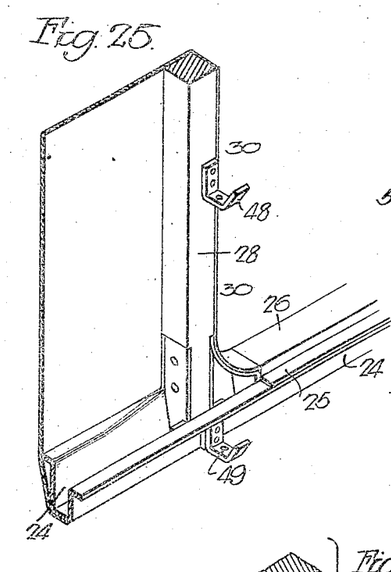
Fig. 25 is a perspective view of one side of the front portion of the body at the rear door jamb, showing the sockets for the front cross plate, which supports the front edge of the seat and stiffens this portion of the body.
Figure 26:
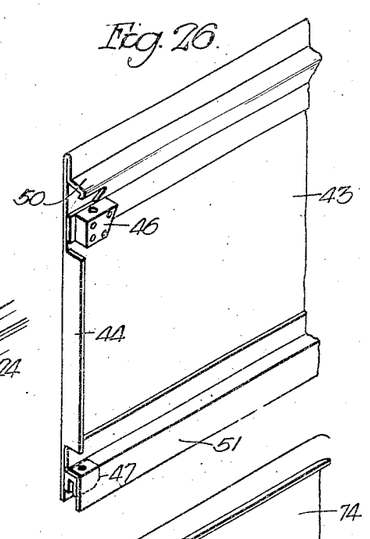
Fig. 26 is a detached perspective view illustrating a portion of said front cross plate.

The front seat panel 43 extends from one post 28 to the other and acts as a stiffening member for the body of the truck between these posts. This panel is clearly shown in Fig. 26 and is flanged at 44, the flanges fitting against the posts. 46 are upper tapered blocks and 47 are lower tapered blocks, which are firmly secured to the front panel 43 and fit the brackets 48 and 49, respectively, brackets 48 being carried on posts 28 and brackets 49 being carried on members 24 (Fig. 25). The front panel is bent to form both a reinforcing flange and a seat support 50 for the front edge of the seat 6. The lower edge of the panel 43 is bent to form a reinforcing member 51, shaped as shown in Figs. 3, 9 and 26, which forms a bracing member for the lower portion of the front panel. Bolts 114 secure the front panel to the posts as shown in Fig. 9.

52 is the rear transverse seat panel, which is made as shown in Figs. 3 and 8, and is bent at the upper edge to form a seat support 112 for the rear end of the seat cushion 6. This panel is secured to the posts 8 by bolts 53. The lower bolt 53, as shown in Figs. 7 and 8, passes through a U-shaped coupling piece 54, which is flanged at 55. These flanges fit over a projection 56 in the socket 57 for the post 8, Fig. 27. A U-shaped piece 58, Fig. 27, fits in the cross member 59 and a vertical bolt 60 extends through the coupling piece 54, the base of the socket 57, the U-shaped member 58 and the cross member 59.

Figures 27, 28:
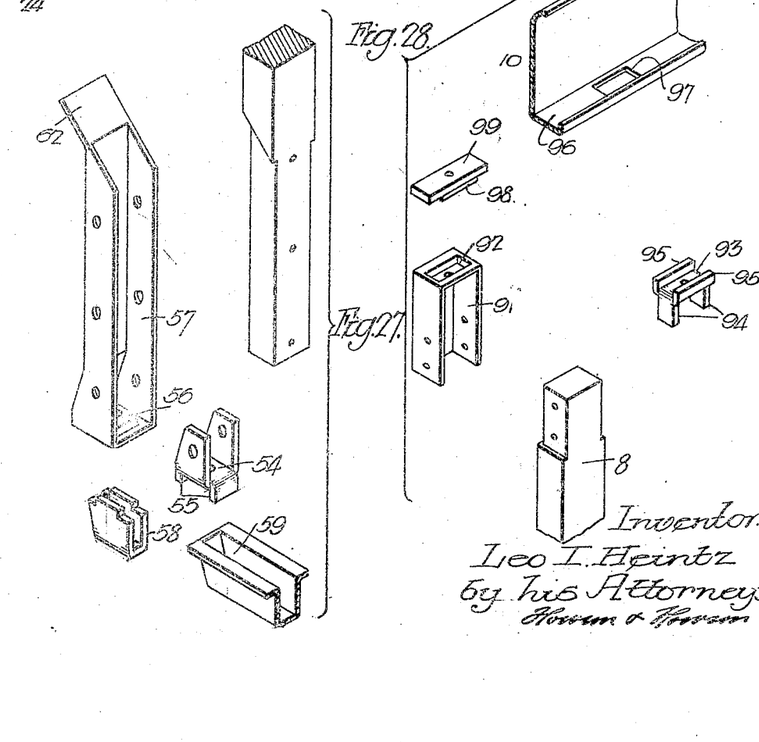
Fig. 27 is a detached perspective view of the parts which compose the socket and attachments for the posts.
Fig. 28 is a detached perspective view showing the parts which connect the upper ends of the posts with the top frame.

The post socket is flared, as shown at 62, Fig. 27, to aid in the support of the portion 19 of the panel.

Referring to Figs. 22, 23 and 24, which illustrate the rear construction of the body, the rear posts 9 are secured to the rear panel sections 3 and to a cross piece 59ª in substantially the same manner as the front posts. 57ª is a socket for the post having a base 55ª and mounted on this base is a coupling piece 54ª, similar to the piece 54. Located in the cross member 59ª is a U-shaped piece 58ª similar to the piece 58. A bolt 60ª secures the several parts together. The cross member 59ª is flanged, as shown in Fig. 23, and is secured to the bottom boards by bolts 63, which also secure the channel plate 64, which extends across the rear end of the body.

If a tail board is used, then an angle bar 66 is extended across the body under the bottom board and is secured to the flooring and panel sections 3 by bolts 67. Plates 68 are riveted to this angle bar. The bolts 63 also extend through these plates. The plates are turned up at the rear ends to form one part of a hinge 69. The other part 70 is secured to the tail board, as clearly shown in Figs. 23 and 24.

In the drawings, one form of stop is illustrated for the tail board. This stop consists of a hinged member 71 pivoted at 72 to the cross member 59ª. The tail board has a projection 73 which strikes against the stop when the stop is projected, as in Fig. 23, so as to limit its movement, but, when it is wished to turn the tail board down to its full extent, then the stop is turned back, which allows the tail board to swing freely on its pivot. In the present instance, there are two hinges and two stops, but the number of hinges may be varied without departing from the essential features of the invention.

Figures 29, 30, 32, 33, 34, 35, 36, 37:
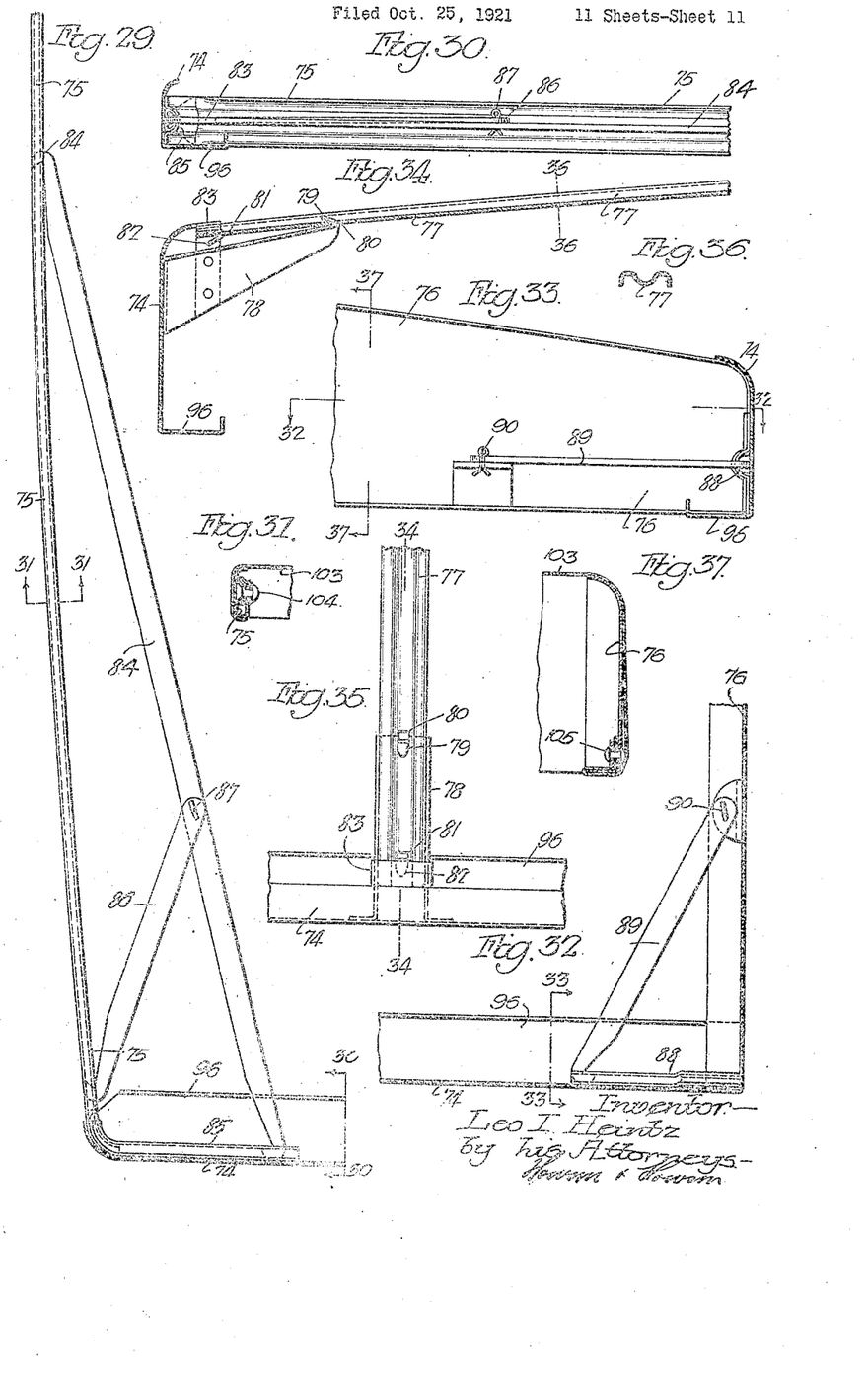
Fig. 29 is a plan view of one half of the forward end of the top showing the braces.
Fig. 30 is a sectional view on the line 30—30, Fig. 29.
Fig. 32 is a sectional plan view on the line 32—32, Fig. 33, of a rear corner of the top showing the brace.
Fig. 33 is a sectional view on the line 33—33, Fig. 32.
Fig. 34 is a sectional view on the line 34—34, Fig. 35, showing the connection between a side member and one of the bows.
Fig. 35 is a plan view illustrating the bow connection with the side frame.
Fig. 36 is a sectional view of one of the bows on the line 36—36, Fig. 34.
Fig. 37 is a sectional view on the line 37—37, Fig. 33, showing one method of securing the cloth top to the frame.

The top of my improved knock down body is shown in Figs. 1, 2 and 16 to 18 and 29 to 35 inclusive. Mounted on the posts 8 and 9 is the top section 10, consisting of two side members 74 and 74ª, a front end member 75, a rear end member 76 and intervening bow members 77, which extend from one side of the top to the other. Secured to each side member 74, 74ª are brackets 78 having projections 79 at their outer ends, which extend through perforations 80 in the bow members 77. 81 are perforations at the extreme end of the bow members for the reception of a bent projection 82 on a U-shaped plate 83 secured to the bracket 78. When the bow members are engaged, they hold the two side frames rigidly in position. The front end member 75 is attached to the side members by a bar 84 hooked at both ends, and the hook at one end extends into an opening in the end member 75 and the hook at the other end engages a channel member 85 secured to the front end of each side member. This hooked bar 84 is stiffened by a brace 86 secured to the bar at 87 and having a hook at the opposite end, which passes through an opening in the end member. The rear member 76 of the top fits in a pocket between a channel member 88 and each side frame and a brace 89 is attached at 90 to the end member 76, and has a hook at the opposite end, which engages the channel member 88. The front member 75 fits in a pocket between the channel member 85 and each side frame, as shown in Figs. 29 and 30.

At the upper end of the posts 8 and 9 is a socket member 91, recessed at 92. Resting on the end of the post is a flanged plate 93 having downward flanges 94 and upturned flanges 95. The socket member rests on the upturned flanges and the bottom flange 96 of the side member 74 is perforated at 97 to receive the depending portion 98 of a clamp plate 99. A bolt 100 extends through perforations in the flanged plate 93, the socket 91 and the clamp plate 99, holding the parts firmly together, as the socket member is secured to the post by rivets, or other fastenings 101.

Figure 19:
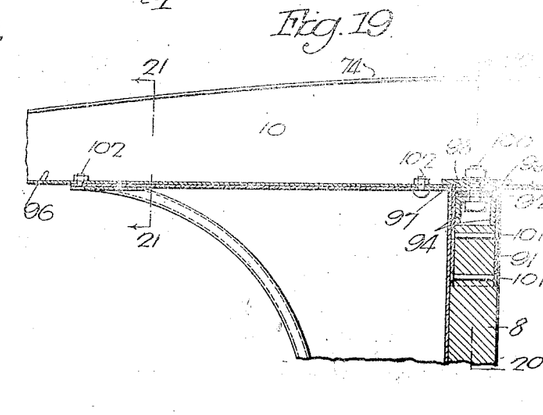
Fig. 19 is a view of the front portion of the top showing the method of securing the top to one of the front posts.
Figure 20:
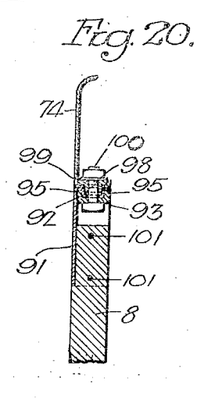
Fig. 20 is a sectional view on the line 20—20, Fig. 19.
Figure 21:
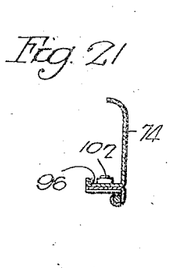
Fig. 21 is a sectional view on the line 21—21, Fig. 19.

The forward end of the top section extends over the seat and to the wind shield, in the present instance. The side plates of the seat section extend to the top, as shown in Fig. 19, and are secured thereto, by bolts 102. This aids in supporting the overhanging front portion of the top. The cloth, or other covering 103 for the top, is attached to the front and rear end members and is stretched over the frame and may be secured to the sides by rivets, buttons, or other suitable fastenings.

Each of the cross bows 77 is made in cross section, as shown in Fig. 36. This form may be modified, however, without departing from the spirit of the invention.

While the cloth cover may be secured to the top frame in any manner desired, in Fig. 31 the front edge of the cover 103 is shown folded under the front frame 75 and secured thereto by rivets 104, while the rear end of the cover is shown secured to the rear frame, Fig. 37, being turned over under the lower flange of the frame and secured to the frame by rivets 105. In some respects the top structure disclosed herein is similar to that shown and claimed in an application filed by me on the 7th day of November, 1921, Serial No. 513,415, knock-down top for vehicles.

By the above description, it will be seen that the delivery bodies may be manufactured in large quantities at a minimum of expense, as the parts are interchangeable and can be duplicated, when necessary. The parts are so formed that they can be easily packed and crated for shipment and when they reach their destination they can be assembled without skilled labor. When assembled, the body is rigid and substantial and capable of sustaining the strains to which it is subjected.

I claim:

1. In vehicle body construction, the combination of two panel sections; a post socket at each end of each panel section; a post adapted to each socket; a transverse member; a double flanged plate mounted between the end of the socket and post; a U-shaped member located in the transverse member; and a vertical bolt securing the several parts together.

2. In vehicle body construction, the combination of two panel sections; transverse members extending from the lower end of one panel section to the lower end of the other panel section; a post socket at each corner of the body and attached to the panel sections; posts secured in the sockets; vertical bolts attaching the parts together at the corners; a top section; sockets for the upper ends of the posts; and vertical bolts securing the sockets to the top section.

3. In a vehicle body, in combination, forward side sections including posts detachably secured to the body; front and rear transverse seat panels extending from one side section to the other; a seat mounted on said panels, the front panel having tapered blocks at each end, the said posts having tapered brackets fitting the blocks; and vertical bolts extending through the blocks and the brackets, securing the parts together.

4. In vehicle top construction, in combination, side members having lower flanges and curved at the top edges and having a series of inwardly projecting brackets having hooked projections at the ends; a series of transverse bows perforated to receive the hooks of the brackets and perforated near their ends; a plate on each bracket having a hook extending through the said perforations; and front and rear transverse members detachably connected to the side members.

5. In vehicle construction, the combination with a body having posts, of top side members mounted on the posts; transverse bows connecting the side members; front and rear members; pockets at the front and rear of the side members to receive the ends of the front and rear members; and hooked braces engaging the side members and the front and rear members.

6. In a vehicle top, the combination of side members having pockets; front and rear members adapted to said pockets; brace bars hooked at each end and engaging the side and front members; and a hooked stay bar detachably attached to the brace bar and engaging one of the parts near where they are attached together.

7. In a knock-down vehicle body, a dashboard, a cowl including top and side panels having interlocking flanges, clamping plates engaging the flanges from opposite sides, the edges of both flanges being bent over an edge of one of said clamping plates, and a bolt engaging said clamping plates, panels and dashboard, whereby said top and side panels may be secured detachably together and said clamping plates and said panels may be secured detachably to said dashboard.

8. In a vehicle body, including two posts one at each side of the body, a body stiffening panel extending between said posts, flanges on said panel fitting against said posts, a reenforcing flange formed along the top of said panel, and means for detachably securing said panel to said posts.

9. In a vehicle body, including two posts one at each side of the body, of a body stiffening panel extending between said posts, flanges on said panel fitting against said posts, a reenforcing flange formed along the top of said panel, a rib formed along the lower portion of said panel, and means for detachably securing said panel to said posts.

10. In a vehicle body, including two posts one at each side of the body, a seat, of a body stiffening panel extending between said posts, flanges on said panel fitting against said posts, a flange formed along the top of said panel, constituting both a reenforcing flange and a support for said seat, a rib formed along the lower portion of said panel, and means for detachably securing said panel to said posts.

11. In vehicle body construction, the combination with a cross piece and a socket, of a coupling member secured to said socket and having downwardly extending flanges, laterally overlapping upwardly extending flanges on a member secured to said cross piece, and means, comprising a bolt extending through both of said members, for detachably securing said cross piece and socket together.

12. In vehicle body construction, the combination with a cross piece and a socket, of a coupling member secured to said socket and having downwardly extending flanges, laterally overlapping upwardly extending flanges on a member secured to said cross piece, and means, comprising a bolt extending through both of said members, for detachably securing said cross piece and socket together, said cross piece being in channel form with the channel uppermost and the said member thereon being U-shaped and seated within said channel, said socket being hollow and said coupling piece having flanges extending upwardly within said socket and abutting and secured to opposite walls thereof.

13. In vehicle body construction, in combination, flooring comprising a plurality of planks placed edge to edge with aligned rear ends, a channel shaped member bounding the rear ends of said planks, a cross piece extending the length of said member and having flanges abutting said member from below, and means, comprising bolts, for detachably securing said flooring channel member, and cross piepe together.

14. In vehicle body construction, in combination, flooring, an angle bar extending across the flooring and secured to the lower side thereof, rearwardly extending plates secured to said angle bar and to said flooring, a tail board hinged to said plates, a cross piece, a projection on the rear side of said tail board, and an adjustable stop for said projection pivoted on said cross piece.

15. In vehicle top construction, the combination with a side member and a cross member, of a connecting bar extending from one of said members to the other and having a hook at one end detachably engaging one of said members and a hook at the other end detachably engaging the other of said members, and a brace bar pivoted at one end medially on said connecting bar and having a hook on the other end detachably engaging one of said connected members.

16. In vehicle body construction, the combination with a post and a top side member, of a socket member on said post, a recess in said socket member, an opening in said top side member registering with said recess, a clamp plate over said top side member and having a depending portion extending through said opening and seated in said recess, and means, comprising a bolt, for detachably clamping said clamp plate and socket against said top side member from opposite sides.

17. In vehicle body construction, the combination with a post and a top side member, of a socket member secured to one end of said post, a member at the socketed end of said post having spaced depending flanges resting thereon and having spaced upwardly extending flanges abutting against an end of said socket, a recess in the end of said socket, an opening in said top side member registering with said recess, a clamp plate over said top side member and having a depending portion extending through the opening therein and into said recess, and a bolt extending through said flanged member, said socket at the recess, said opening in the top side member, and said clamp plate.

18. In a knock-down vehicle body, a rear wagon box, including, in combination, two opposite, sheet metal side panels, a post socket secured to each end of each panel, a rear cross tie member detachably secured to the opposite rear post sockets and supported thereby, a front cross tie detachably secured to the opposite front post sockets, a transverse tie panel detachably secured to the opposite front post sockets above the front cross tie, and a removable body floor section supported by said panels, said side panels being shaped with reenforcing and stiffening formations and having sufficient rigidity to support said floor section and the load.

19. In a knock-down vehicle body, in combination, two opposite rear side panels, a post socket secured to each side panel at its front edge, two opposite cab side panels, each detachably secured at its rear edge to one of said sockets, a cross tie member detachably secured to said sockets, and a sill member secured to each cab panel along its lower edge and detachably secured at its rear end to one of said sockets.

LEO I. HEINTZ.